United States Patent [19]

Dransfield et al.

[11] Patent Number: 5,336,521

[45] Date of Patent: Aug. 9, 1994

[54] METALLIC OXIDES

[75] Inventors: Graham P. Dransfield, Stockton on Tees; Denis J. King, Middlesbrough, both of England

[73] Assignee: Tioxide Group Services Limited, London, England

[21] Appl. No.: 970,813

[22] Filed: Nov. 3, 1992

[30] Foreign Application Priority Data

Nov. 2, 1991 [GB] United Kingdom ............... 9123280.1

[51] Int. Cl.$^5$ ............................................... B05D 7/00
[52] U.S. Cl. ............................................ 427/220; 501/103
[58] Field of Search ........................ 501/102, 103, 104; 423/608; 424/220

[56] References Cited

U.S. PATENT DOCUMENTS

| | | | |
|---|---|---|---|
| 3,259,585 | 7/1966 | Fitch et al. | 252/313 |
| 3,957,500 | 5/1976 | Pitts | 501/103 |
| 4,719,091 | 1/1988 | Wusirika | 423/82 |
| 4,900,701 | 2/1990 | Morishita et al. | 501/102 |
| 4,985,379 | 1/1991 | Egerton et al. | 501/104 |
| 4,999,182 | 3/1991 | Baumard et al. | 423/608 |
| 5,017,532 | 5/1991 | Sonnenberg et al. | 501/103 |
| 5,104,832 | 4/1992 | Michel et al. | 501/103 |

FOREIGN PATENT DOCUMENTS

| | | |
|---|---|---|
| 0013599 | 1/1980 | European Pat. Off. |
| 0210614 | 2/1987 | European Pat. Off. |
| 0262579 | 9/1987 | European Pat. Off. |
| 0354573 | 8/1989 | European Pat. Off. |
| 0396988 | 11/1990 | European Pat. Off. |
| 0410999 | 12/1990 | European Pat. Off. |
| 0454138 | 10/1991 | European Pat. Off. |
| 0469729 | 2/1992 | European Pat. Off. |
| 2590887 | 6/1987 | France |
| 54-26392 | 3/1979 | Japan |
| 55-121969 | 9/1980 | Japan |
| 57-191234 | 11/1982 | Japan |
| 58-176127 | 10/1983 | Japan |
| 59-162173 | 9/1984 | Japan |
| 59-164673 | 9/1984 | Japan |
| 61-77665 | 4/1986 | Japan |
| 2137728 | 5/1990 | Japan |
| 2175602 | 7/1990 | Japan |
| 2181723 | 9/1986 | United Kingdom |
| 2204030 | 4/1988 | United Kingdom |
| 2234500 | 5/1990 | United Kingdom |
| 2250735 | 11/1991 | United Kingdom |

*Primary Examiner*—Karl Group
*Assistant Examiner*—Alan Wright
*Attorney, Agent, or Firm*—Baker & Botts

[57] ABSTRACT

A process for coating particulate zirconia for use in ceramics is claimed. The particulate zirconia is coated with a hydrous oxide of a stabilizing metal such as yttrium, an alkaline earth metal or a rare earth metal by hydrolysis of a salt of the metal. An initial dispersion of the zirconia is prepared at a pH above 7.5 and, preferably, in the presence of an organic dispersing agent.

The coated zirconia produced according to the process has been shown to form ceramic bodies with a higher strength than those prepared from particulate zirconia coated by prior known processes.

41 Claims, No Drawings

METALLIC OXIDES

This invention relates to metallic oxides and particularly zirconia.

Zirconia is of increasing use as a ceramic and efforts to improve the strength of fired ceramics based on zirconia are being made. Coating particulate zirconia with at least one stabilising agent has been shown to produce ceramic bodies having improved properties, including strength.

A further advance has now been made in the coating of zirconia producing unexpected advantages in the product and the process for the manufacture thereof.

According to the present invention a process for the manufacture of a ceramic-forming composition comprises adding to an aqueous dispersion of particulate zirconia a water-soluble hydrolysable compound of a stabilising metal for zirconia and depositing on the particulate zirconia a coating of a hydrous oxide of said stabilising metal in which process an initial aqueous dispersion of zirconia is prepared said initial dispersion having a pH value of at least 7.5.

The term "stabilising metal for zirconia" is meant to include all those metals the oxides of which, when incorporated in zirconia, stabilise the zirconia partially or fully in the cubic or tetragonal crystalline form.

Such stabilising metals include yttrium, calcium, magnesium, barium, strontium, cerium and rare-earth metals such as lanthanum, neodymium or praseodymium. Preferably the zirconia is coated with a hydrous oxide of yttrium as the principal stabilising agent.

Preferably the particulate zirconia is also coated with a hydrous oxide of zirconium, titanium or aluminium and, although the hydrous oxide can be present as a mixed coating layer with the hydrous oxide of the stabilising metal, advantageously it is present as an initial coating layer.

In its most preferred form the process of the invention includes in the initial aqueous dispersion having a pH of at least 7.5 the presence of a dispersing agent in sufficient quantity to prevent the formation of a gel-like condition which can otherwise occur on rendering the aqueous dispersion alkaline.

The products comprise particulate zirconia preferably having a size such that the majority of the particles have a diameter of less than or equal to 0.5 micron and more preferably less than 0.2 micron.

The amount of the hydrous oxide of the stabilising metal present as a coating depends on two factors. Firstly, the actual amount employed depends on the particular metal oxide deposited. The amount also depends on the degree of stability that it is desired should be imparted to the fired zirconia. Fully stabilised zirconia is usually in the cubic crystalline form and less stabilised zirconia usually includes other crystalline forms.

Partial stabilisation of the zirconia is as desirable in certain circumstances as is full stabilisation i.e. stabilising the product to the highest extent possible. Generally speaking for a partially stabilised product the amount of the hydrous oxide present as coating will be less than that required for a fully stabilised product.

When a hydrous oxide of yttrium is present it has been found useful that the amount of hydrous oxide of yttrium which is present is from 0.5 to 7 mole percent expressed as $Y_2O_3$ on moles of zirconia when partial stabilisation is desired. Most preferably for a partially stabilised product the amount of hydrous oxide of yttrium is from 2 to 5 mole percent $Y_2O_3$ based on moles of zirconia. When the hydrous metal oxide is a hydrous oxide of calcium, magnesium, strontium, barium or cerium, etc. then for a partially stabilised product it is desired that the amount of the hydrous oxide is, generally speaking, from 2 to 10 mole percent as oxide based on moles zirconia. Preferably for a partially stabilised product the amount of the hydrous oxide of calcium, magnesium, strontium, barium or cerium and of rare-earth metals is from 4 to 8 mole percent as oxide on moles of zirconia.

In order that the treated product should be as fully stabilised as possible with respect to its crystal structure then it is desired that the amount of hydrous oxide of yttrium is from 5 to 10 mole percent, preferably 6 to 9 mole percent as $Y_2O_3$ based on moles zirconia when the stabilising agent is yttria. Similarly to produce a fully stabilised treated zirconia the amount of hydrous oxide of calcium, magnesium, strontium, barium or cerium, etc. is from 8 to 20 mole percent, and preferably from 9 to 17 mole percent as oxide on moles of zirconia.

Naturally it is possible to deposit two or more different metal oxides selected from the stabilising agents mentioned and in this case the aggregate amount deposited need not necessarily exceed the amount for an individual hydrous metal oxide.

The amount of the hydrous oxide of zirconium, titanium or aluminium deposited either as a discrete free coating or together with the other metal hydrous oxide generally speaking is from 0.2 to 5 mole percent and preferably from 0.5 to 2 mole percent expressed as $ZrO_2$, $TiO_2$ or $Al_2O_3$ on moles zirconia.

In accordance with the invention the particulate zirconia used to form the basis of the material to be used as a ceramic can be formed by any suitable method e.g. by the vapour phase oxidation of an oxidisable vaporised zirconium compound. Typical zirconium compounds which can be oxidised in the vapour state are the zirconium halides, particularly, zirconium tetrachloride. The oxidation in the vapour state usually is carried out by mixing the zirconium chloride with an excess of heated oxygen under such conditions that oxidation of the zirconium tetrachloride takes place and zirconia of the desired size is obtained directly on cooling and separating from the gas stream. A preferred method of heating the oxygen to react with the zirconium tetrachloride is to pass the oxygen through an electric arc between two electrodes supplied with electrical power at an appropriate voltage and amperage which commonly generates a so-called electrical plasma. This form of manufacture of the particulate zirconia has an advantage in that the product is obtained in the oxide form directly.

Any residual chloride ions in the particulate zirconia are removed prior to further processing. For example, the zirconia can be heated at a temperature sufficient to remove chloride ions but insufficient to cause unwanted aggregation of the product. Temperatures up to 300° C. can be employed but it has been found acceptable to heat to not more than 200° C. to achieve satisfactory removal of chloride ions. The chloride ions can also be removed by slurrying the particulate zirconia with water at a low pH, for example below 1, the pH being adjusted if necessary with an acid such as nitric acid, allowing the particles to settle and decanting off the supernatant liquor. The efficiency of chloride ion removal is substantially increased by repeating this slurrying and decanting process at least once.

Alternatively the particulate zirconia can be prepared by hydrolysis of a zirconium halide, oxyhalide, alkoxide or a sulphate via a wet chemical process rather than the dry vapour phase oxidation route or by a gas-phase hydrolysis process.

The particulate zirconia initially for use in the coating process of the invention must be present in an aqueous dispersion and particularly when the zirconia has been prepared by a wet chemical route then preferably the dispersion is prepared by mixing the particulate zirconia with water in the presence of a dispersing agent which does not introduce into the particulate zirconia elements which permanently remain mixed therewith and have a deleterious effect on fired zirconia ceramics. For this reason the use of organic based dispersing agents is preferred.

The dispersing agent which is present in the preferred aqueous dispersion of the present invention is preferably a polycarboxylic acid or a salt thereof. Partially or fully neutralized salts are usable e.g. the alkali metal salts and ammonium salts. Examples of dispersing agents are polyacrylic acids, substituted acrylic acid polymers, acrylic copolymers, sodium and/or ammonium salts of polyacrylic acids and sodium and/or ammonium salts of acrylic copolymers. Such dispersing agents are typified by polyacrylic acid itself and sodium or ammonium salts thereof as well as copolymers of an acrylic acid with other suitable monomers such as a sulphonic acid derivative, e.g. 2-acrylamido-2-methyl propane sulphonic acid. Comonomers polymerisable with the acrylic or a substituted acrylic acid can also be ones containing a carboxyl grouping. Usually the dispersing agents have a molecular weight of from 1000 to 10,000 and are substantially linear molecules.

The amount of the dispersing agent used is usually within the range 0.5 to 3.5 percent by weight of the particulate zirconia in the dispersion and preferably about 1 percent by weight.

The initial aqueous dispersion of the particulate zirconia has a pH value of at least 7.5 on preparation and this is usually achieved by mixing an alkali with the particulate zirconia and dispersing agent, if used. Usually the alkali will be such as not to introduce unwanted metal or other ions into the dispersion and preferably an alkaline ammoniacal compound or an amine is used. Ammonium hydroxide is preferred. The pH value preferably is at least 8 and higher values can be employed if desired.

The aqueous dispersion preferably is prepared by milling particulate zirconia, the aqueous alkali and dispersing agent, if present, in water until a dispersed product is obtained. Typically milling can be carried out in a sand mill, ball mill or any other type of mill.

Typically the dispersion of particulate zirconia contains zirconia in a concentration of up to 1500 grams per liter. Usually the amount of zirconia is not less than 50 grams per liter zirconia.

Usually prior to coating the aqueous dispersion of zirconia is adjusted to a concentration of from 100 to 400 grams per liter preferably from 200 to 300 grams per liter of zirconia.

If the zirconia is to carry an initial coating of a hydrous oxide of zirconium, titanium or aluminum then to the aqueous dispersion of the particulate zirconia there is added an appropriate water soluble hydrolysable salt in an amount sufficient to introduce on hydrolysis the required amount of the hydrous oxide. Typical water soluble salts which can be used are chlorides, nitrates or sulphates. Precipitation of the hydrous oxide on the particles of zirconia is effected by maintaining the pH of the solution at a value sufficiently alkaline to deposit the hydrous oxide and this treatment to deposit the hydrous oxide may be carried out, if desired, prior to the addition of any other water soluble compound of the stabilising metal which is to be used to deposit the other one or more hydrous oxides. However, if desired, depositing the hydrous oxide coating on the zirconia particles may be deferred until after the other hydrolysable metal compounds have been mixed with the aqueous dispersion although it is preferred that the source of hydrous zirconium, titanium or aluminium oxide should be mixed with the aqueous dispersion of the zirconia particles prior to mixing therewith these other hydrolysable metal compounds.

The aqueous dispersion of particulate zirconia is mixed with a water soluble hydrolysable compound of the stabilising metal such as of yttrium, calcium, magnesium, strontium, barium or cerium, etc. or any two or more of such compounds in an appropriate amount to introduce the required level of hydrous oxide of the particular specified metal. Typical hydrolysable compounds of yttrium which may be used are yttrium chloride, yttrium nitrate and yttrium sulphate. Typical water soluble salts of the other metals which can be employed depend on the particular metal but include the chlorides, nitrates, some sulphates and acetates.

The coating process can be carried out at any suitable temperature but coating at temperatures above ambient, for example 40° C. to 70° C., appears to improve the filtration properties of the coated product.

The addition of the various reagents used as precursors for the coating(s) of hydrous oxides generally affects the pH value of the dispersion. The magnitude of any pH change will depend upon the reagent used and the amount added. Typically, the use of chlorides, sulphates and nitrates as hereinbefore mentioned reduces the pH value of the dispersion to below 7. Usually, therefore, after mixing of the various reagents with the aqueous dispersion of zirconia the pH of the dispersion is adjusted to a value sufficient to precipitate the respective hydrous oxide coatings. The actual level to which the pH must be adjusted depends on the particular hydrous oxide to be deposited and for instance when the oxide is a hydrous oxide of yttrium or of cerium then it is sufficient to adjust the pH of the aqueous dispersion to a value within the range 7 to 9 to effect the precipitation of hydrous oxide from the hydrolysable metal compound. Where the hydrous metal oxide to be precipitated is other than of yttrium or of cerium then it has been found that generally an appropriate pH to effect this is within the range 8 to 10.

When it is necessary to increase the pH of the aqueous dispersion then this preferably is carried out by the addition of an appropriate alkali to the aqueous dispersion. It is most convenient if the alkali is ammonium hydroxide since this does not introduce any objectionable metallic ions into the solution and waste ammonia can be driven off by heating. For the deposition of zirconium in its hydrous oxide form the addition of ammonium hydroxide is eminently suitable and ammonium hydroxide also can be used if hydrous yttrium oxide is deposited at about a pH of 7. However where other hydrous metal oxides are being deposited then stronger alkali is necessary and usually an alkaline metal hydroxide is required such as sodium hydroxide or potassium hydroxide. However when such alkaline metal hydroxides are used it is necessary to wash the product adequately to remove any contaminating alkali metal ions. Normally the product obtained should not contain an alkali metal impurity level greater than 0.2 percent by weight expressed as $M_2O$.

After deposition of the hydrous oxide coating the product is separated by filtering and washing as necessary.

In the process of the present invention it has been noticed that milling of the coated product is not usually necessary to achieve a high final fired strength. Hitherto milling has been advisable with prior processes.

After drying the powdered product is eminently suitable for use in the manufacture of shaped ceramic bodies by firing.

The product in having the stabilising agent present as a coating provides a well distributed and intimate mixture of the agent and on firing good incorporation of the agent through the zirconia is achieved.

In order that the coated zirconium compound is most useful in the preparation of ceramic bodies it has been found that the amount of silica as impurity in the material should be less than 0.03% by weight $SiO_2$ by weight of $ZrO_2$ in the particulate material.

EXAMPLE 1

Zirconium oxide particles of approximately 0.1 microns in diameter prepared by the vapour phase oxidation of zirconium tetrachloride were added to water to give a suspension which was 20% by volume (1100 grams per liter) zirconium oxide. The pH of this suspension was approximately 1.5. An amount of a solution of an organic dispersant (ammonium polyacrylate sold under the Trade Name Dispex A40) was added sufficient to provide 1% by weight of the polyacrylate based on weight of the zirconium oxide present. The pH of the suspension was then between 3 and 4 and this was raised to a value of 9.0 by the addition of sufficient quantity of 10% by volume ammonia solution.

This suspension was transferred to containers suitable for milling the zirconium oxide particles using 9.5 mm cylindrical magnesia stabilised zirconia beads. After milling the suspension was diluted to a concentration of 250 grams per liter by the addition of deionised water and an aqueous solution of acid zirconium sulphate was added to the suspension in an amount equivalent to 1% by weight $ZrO_2$ on solids. This reduced the pH of the total suspension to a value between 3 and 4. An aqueous solution of yttrium nitrate was then added, equivalent to 4.7% by weight $Y_2O_3$ on solids. This further reduced the pH to a value less than 1. After stirring for 30 minutes the pH was raised, by the addition of ammonia solution containing 10% ammonia by volume, to a value of 8.5 and the suspension stirred for a further 30 minutes before filtering, washing and drying the filter-cake. A suspension of the coated zirconia in iso-propyl alcohol was prepared and then the alcohol and associated water removed by drying.

The dried filter cake was then milled as a 300 grams per liter suspension in iso-propyl alcohol, following which it was dried again and sieved through a coarse 250 micron mesh nylon sieve. 32 mm diameter discs of the dried powder were pressed uniaxially at a pressure of 20 MPa and sintered for a period of 1 hour at 1450° C. Five sintered discs prepared in this way were tested for mechanical strength using a biaxial disc flexure technique. This gave a mean polished strength of 1600 MPa. Five unpolished discs gave a mean strength of 1289 MPa.

Discs prepared from a sample prepared as above but omitting the final milling stage in iso-propyl alcohol, gave an unpolished strength of 954 MPa. Dispersion tests showed the absence of aggregates/agglomerates greater than 10 micron.

EXAMPLE 2 (comparative)

The experiment described in Example 1 was repeated except that the initial suspension was prepared differently.

The zirconium oxide particles were added to water at a concentration of 250 grams per liter. The initial pH was approximately 1.5. This pH was lowered to 0.75 by the addition of nitric acid. The suspension was then treated as in Example 1. The polished strength in this case was 1173 MPa and the unpolished strength 1131 MPa.

Dispersion tests showed the presence of agglomerates up to 20 micron diameter.

The method employed in Example 1 produces a product which when fired has a higher strength.

From previous experience it would be expected that a fired ceramic prepared from unmilled product of Example 2 would have had an unpolished strength of about 750 MPa.

We claim:

1. A process for the manufacture of coated particulate zirconia suitable for forming a ceramic composition comprising the steps of:
   a) forming an aqueous dispersion of particulate zirconia with an initial pH value of at least 7.5,
   b) adding a water-soluble hydrolyzable compound of a stabilizing metal for zirconia selected from the group consisting of yttrium, calcium, magnesium, barium, strontium, cerium, lanthanum, rare earth metals and mixtures thereof, to the dispersion, and
   c) adjusting the pH of the dispersion to deposit a coating of a hydrous oxide of said stabilizing metal on the particulate zirconium.

2. A process according to claim 1 in which the rare earth metal is selected from the group consisting of neodymium and praseodymium.

3. A process according to claim 1 in which the majority of the zirconia particles have a diameter less than 0.5 micron.

4. A process according to claim 3 in which the diameter is less than 0.2 micron.

5. A process according to claim 1 in which the initial pH value of the aqueous dispersion is at least 8.

6. A process according to claim 1 in which the stabilizing metal is yttrium and the water-soluble hydrolyzable compound of yttrium is used in an amount which is sufficient to provide a coating of hydrous yttrium oxide comprising 0.5 to 7 mole percent expressed as $Y_2O_3$ based on moles of zirconia.

7. A process according to claim 6 in which the hydrous yttrium oxide comprises from 2 to 5 moles percent expressed as $Y_2O_3$ based on zirconia.

8. A process according to claim 1 in which the stabilizing metal is selected from the group consisting of calcium, magnesium, strontium, barium and cerium and the water soluble hydrolyzable compound of the stabilizing metal is used in an amount which is sufficient to provide a coating of hydrous oxide comprising from 2 to 10 mole percent as oxide based on moles of zirconia.

9. A process according to claim 8 in which the hydrous oxide comprises from 4 to 8 mole percent as oxide on moles of zirconia.

10. A process according to claim 1 in which the stabilizing metal is yttrium and the water-soluble hydrolyzable compound of yttrium is used in an amount which is sufficient to provide a coating of hydrous yttrium oxide comprising 5 to 10 mole percent expressed as $Y_2O_3$ based on moles of zirconia.

11. A process according to claim 10 in which the hydrous yttrium oxide comprises from 6 to 9 mole percent expressed as $Y_2O_3$ based on zirconia.

12. A process according to claim 1 in which the stabilizing metal is selected from the group consisting of calcium, magnesium, strontium, barium and cerium and the water soluble hydrolyzable compound of the stabilizing metal is used in an amount which is sufficient to provide a coating of hydrous oxide comprising from 8 to 20 mole percent as oxide based on moles of zirconia.

13. A process according to claim 12 in which the hydrous oxide comprises from 9 to 17 mole percent as oxide on moles of zirconia.

14. A process according to claim 1 further comprising the step of forming coating of a hydrous oxide of a metal selected from the group consisting of zirconium, titanium, and aluminum on the particulate zirconia.

15. A process according to claim 1 further comprising the step of forming an initial coating of a hydrous oxide of a metal selected from the group consisting of zirconium, titanium, and aluminum on the particulate zirconia prior to depositing the hydrous oxide coating of the stabilizing metal.

16. A process according to claim 14 in which the hydrous oxide of zirconium, titanium or aluminium is present in an amount of from 0.2 to 5 mole per cent expressed as $ZrO_2$, $TiO_2$ or $Al_2O_3$ based on moles of zirconia.

17. A process according to claim 16 in which the amount is from 0.5 to 2 mole per cent expressed as $ZrO_2$, $TiO_2$ or $Al_2O_3$ based on zirconia.

18. A process according to claim 1 in which the aqueous dispersion of zirconia is prepared in the presence of a dispersing agent.

19. A process according to claim 18 in which the dispersing agent is an organic dispersing agent.

20. A process according to claim 19 in which the dispersing agent is a polycarboxylic acid or a salt thereof.

21. A process according to claim 20 in which the dispersing agent is an alkali metal salt or an ammonium salt of a polycarboxylic acid.

22. A process according to claim 20 in which the polycarboxylic acid is selected from the group consisting of polyacrylic acids, substituted acrylic acid polymers and acrylic copolymers.

23. A process according to claim 19 in which the dispersing agent has a molecular weight of from 1000 to 10,000.

24. A process according to claim 19 in which the dispersing agent is a substantially linear molecule.

25. A process according to claim 18 in which the dispersing agent is employed in an amount of from 0.5 to 3.5 per cent by weight with respect to zirconia.

26. A process according to claim 25 in which the amount of dispersing agent is about 1 per cent by weight.

27. A process according to claim 1 further comprising the step of forming the particulate zirconia by vapor phase oxidation of an oxidizable vaporized zirconium compound prior to forming the aqueous dispersion.

28. A process according to claim 1 further comprising the step of heating the particulate zirconia at a temperature of up to 300° C. to remove any chloride ions present prior to forming the aqueous dispersion.

29. A process according to claim 28 in which the temperature is not more than 200° C.

30. A process according to claim 1 further comprising the step of forming an aqueous slurry of particulate zirconia at a pH below 1, allowing the particles of zirconia to settle, and subsequently removing the supernatant liquid from the settled zirconia thereby removing any residual chloride ions present prior to forming the aqueous dispersion.

31. A process according to claim 1 in which the pH of the aqueous dispersion is adjusted to a value above 7.5 by the addition of a compound selected from the group consisting of alkaline ammoniacal compounds and amines.

32. A process according to claim 1 in which the dispersion of particulate zirconia is prepared by milling in a sand mill or a ball mill.

33. A process according to claim 1 in which the dispersion of particulate zirconia is formed at a concentration of up to 1500 grams of zirconia per liter.

34. A process according to claim 1 in which the dispersion of particulate zirconia is formed at a concentration of not less than 50 grams of zirconia per liter.

35. A process according to claim 1 in which the aqueous dispersion of particulate zirconia is adjusted to a concentration of from 100 to 400 grams of zirconia per liter prior to depositing the hydrous oxide coating of of the stabilizing metal.

36. A process according to claim 35 in which the concentration of zirconia is from 200 to 300 grams per liter.

37. A process according to claim 1 in which the water-soluble hydrolyzable compound of a stabilizing metal is selected from the group consisting of chlorides, nitrates, sulphates and acetates of the stabilizing metal.

38. A process according to claim 14 in which the coating of hydrous oxide of zirconium, titanium or aluminium is formed by hydrolysis of a compound of zirconium, titanium or aluminium selected from the group consisting of chlorides, nitrates and sulphates of zirconium, titanium or aluminium.

39. A process according to claim 37 or 38 in which the coating of hydrous oxide of stabilizing metal, zirconium, titanium or aluminium is deposited by the addition of ammonium hydroxide.

40. A process according to claim 1 in which the particles of zirconia are coated at a temperature of from 40° C. to 70° C.

41. A process according to claim 1 in which coated zirconia particles are washed to reduce any alkali metal impurity level to less than 0.2 per cent expressed as $M_2O$.

* * * * *